(12) United States Patent
Stewart et al.

(10) Patent No.: US 7,945,722 B2
(45) Date of Patent: *May 17, 2011

(54) ROUTING DATA UNITS BETWEEN DIFFERENT ADDRESS DOMAINS

(75) Inventors: Heath Stewart, Santa Barbara, CA (US); Michael de la Garrigue, Agoura Hills, CA (US); Chris Haywood, Thousand Oaks, CA (US)

(73) Assignee: Internet Machines, LLC, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/894,003

(22) Filed: Sep. 29, 2010

(65) Prior Publication Data

US 2011/0016258 A1    Jan. 20, 2011

Related U.S. Application Data

(63) Continuation of application No. 12/195,122, filed on Aug. 20, 2008, now Pat. No. 7,814,259, which is a continuation of application No. 11/031,853, filed on Jan. 6, 2005, now Pat. No. 7,421,532, which is a continuation-in-part of application No. 10/993,277, filed on Nov. 18, 2004, now Pat. No. 7,454,552.

(60) Provisional application No. 60/523,246, filed on Nov. 18, 2003.

(51) Int. Cl.
*G06F 13/00*    (2006.01)
(52) U.S. Cl. .......................... 710/316; 710/306; 710/313
(58) Field of Classification Search .................. 710/306, 710/313, 315–317

See application file for complete search history.

(56) References Cited

U.S. PATENT DOCUMENTS

| | | | |
|---|---|---|---|
| 4,330,824 A | 5/1982 | Girard |
| 4,394,725 A | 7/1983 | Bienvenu |
| 4,704,606 A | 11/1987 | Hasley |
| 4,958,299 A | 9/1990 | Akada |
| 5,550,823 A | 8/1996 | Irie |
| 5,555,543 A | 9/1996 | Grohoski |
| 5,617,421 A | 4/1997 | Chin |
| 5,649,149 A | 7/1997 | Stormon |
| 5,659,713 A | 8/1997 | Goodwin |
| 5,841,874 A | 11/1998 | Kempke |
| 5,860,085 A | 1/1999 | Stormon |

(Continued)

OTHER PUBLICATIONS

Petaswitch Solutions, Inc., The Pisces Chipset, Product Brief, 2001, http://www-peta-switch.com/products/product_brief.htm.

(Continued)

*Primary Examiner* — Glenn A Auve
(74) *Attorney, Agent, or Firm* — SoCal IP Law Group LLP; Steven C. Sereboff; John E. Gunther

(57) ABSTRACT

Methods for routing data units and PCI Express switches are disclosed. A plurality of devices may be coupled to a corresponding plurality of physical interfaces, each physical interface having a respective configurable status and a respective address domain, wherein in a first status the interface is transparent, and in a second status the interface is non-transparent. The status of each of the plurality of physical interfaces may be set as transparent or non-transparent. Data units may be switched between the physical interfaces using mapped address input/output, switching data units including masking the address domain for the interfaces configured as non-transparent.

5 Claims, 3 Drawing Sheets

U.S. PATENT DOCUMENTS

| | | | |
|---|---|---|---|
| 5,898,689 | A | 4/1999 | Kumar |
| 5,905,911 | A | 5/1999 | Shimizu |
| 5,923,893 | A | 7/1999 | Moyer |
| 5,961,626 | A | 10/1999 | Harrison |
| 5,982,749 | A | 11/1999 | Daniel |
| 6,067,408 | A | 5/2000 | Runaldue |
| 6,122,674 | A | 9/2000 | Olnowich |
| 6,138,185 | A * | 10/2000 | Nelson et al. ............... 710/33 |
| 6,172,927 | B1 | 1/2001 | Taylor |
| 6,292,878 | B1 | 9/2001 | Morioka |
| 6,346,946 | B1 | 2/2002 | Jeddeloh |
| 6,389,489 | B1 | 5/2002 | Stone |
| 6,442,674 | B1 | 8/2002 | Lee |
| 6,477,623 | B2 | 11/2002 | Jeddeloh |
| 6,493,347 | B2 | 12/2002 | Sindhu |
| 6,510,138 | B1 | 1/2003 | Pannell |
| 6,557,053 | B1 | 4/2003 | Bass |
| 6,574,194 | B1 | 6/2003 | Sun |
| 6,611,527 | B1 | 8/2003 | Moriwaki |
| 6,708,262 | B2 | 3/2004 | Manning |
| 6,714,555 | B1 | 3/2004 | Excell |
| 6,735,219 | B1 | 5/2004 | Clauberg |
| 6,795,870 | B1 | 9/2004 | Bass |
| 6,842,443 | B2 | 1/2005 | Allen, Jr. et al. |
| 6,987,760 | B2 | 1/2006 | Calvignac et al. |
| 7,080,190 | B2 | 7/2006 | Weber |
| 7,096,305 | B2 | 8/2006 | Moll |
| 7,421,532 | B2 | 9/2008 | Stewart et al. |
| 7,454,552 | B2 | 11/2008 | Stewart et al. |
| 7,814,259 | B2 * | 10/2010 | Stewart et al. ............... 710/315 |
| 2001/0037435 | A1 | 11/2001 | Van Doren |
| 2002/0061022 | A1 | 5/2002 | Allen |
| 2002/0099855 | A1 | 7/2002 | Bass et al. |
| 2002/0114326 | A1 | 8/2002 | Mahalingaiah |
| 2002/0122386 | A1 | 9/2002 | Calvignac |
| 2002/0165947 | A1 | 11/2002 | Akerman |
| 2002/0188754 | A1 | 12/2002 | Foster et al. |
| 2003/0084219 | A1 | 5/2003 | Yao et al. |
| 2003/0084373 | A1 | 5/2003 | Phelps et al. |
| 2004/0019729 | A1 | 1/2004 | Kelley et al. |
| 2004/0030857 | A1 | 2/2004 | Krakirian |
| 2004/0123014 | A1 | 6/2004 | Schaefer et al. |
| 2004/0230735 | A1 | 11/2004 | Moll |
| 2005/0117578 | A1 | 6/2005 | Stewart et al. |
| 2006/0010355 | A1 | 1/2006 | Arndt et al. |

OTHER PUBLICATIONS

Petaswitch Solutions, Inc., PetaSwitch Solutions Announces Raising $4 Million in First Round Financing, Press Release, 2001, http://peta-switch.com/newsroom/press_releases.htm.

Petaswitch Solutions, Inc., Company Overview, 2001, http://www.peta-switch.com/markets/overview.htm.

Gupta, Scheduling in Input Queued Switches: A Survey, Jun. 1996, Department of Computer Science, Stanford University, California.

Schoenen, et al, Distributed Cell Scheduling Algorithms for Virtual-Output-Queued Switches, Dec. 1999, pp. 1211-1215, vol. 1, Globecom, IEEE Global Telecommunications Conference.

Fahmy, A Survey of ATM Switching Techniques, Aug. 14, 2001, Department of Computer and Information Science, The Ohio State University.

Stiliadis, et al., Rate-Proportional Servers: A Design Methodology for Fair Queueing Algorithms, Dec. 1995, Computer Engineering & Information Sciences, University of California, Santa Cruz.

Stoica, et al., Earliest Eligible Virtual Deadline First: A Flexible and Accurate Mechanism for Proportional Share Resource Allocation, Department of Computer Science, Old Dominion University, Norfolk, VA.

Klein, PCI Express Is the new I/O Solution of Choice, Article, Nov. 2004, pp. 1-5, Technology @ Intel Magazine, Intel Corporation.

Bhatt, Creating a Third Generation I/O Interconnect, White Paper, 2002, pp. 1-8, Technology and Research Labs, Intel Corporation, http://www.intel.com/technology/pciexpress/downloads/3rdgenwhitepaper.pdf.

Stam, Inside PCI Express, Article, Sep. 9, 2002, pp. 1-37, ExtremeTech, http://www.extremetech.com/article2/0,3973,522663,00.asp.

Intel, Improve Video Quality with the PCI Express x16 Graphics Interface, Sales Brief, 2004, pp. 1-2, Intel Corporation, http://www.intel.com/design/chipsets/pciexpress.pdf.

Mayhew et al., PCI Express and Advanced Switching: Evolutionary Path to Building Next Generation Interconnects, Proceedings of 11th Symposim on High Performance Interconnects, Aug. 20, 2003, pp. 21-29, IEEE, Piscataway, NJ.

Danny Chi et al. Utilizing Non-Transparent Bridign in PCI Express Base™ Create Multi Processor Systems, Part I, TechOnLine Webcast, Aug. 26, 2003, http://seminar2.techonline.com/~plx22/aug2603/index.shtml.

Jack Regula, Utilizing Non-Transparent Bridign in PCI Express Base™ to Create Multi Processor Systems, Part II, TechOnLine Webcast, Oct. 21, 2003, http://seminar2.techonline.com/~plx22/oct2103/index.shtml.

Mark Hachman, Intel Reveals Details of Arapahoe/3GIO After SIG Approval, Technology News by ExtremeTech, Aug. 3, 2001, http://www.extremetech.com/article2/0,2845,118922,00.asp.

Ajanovic, et al., 3GIO Protocol and Software Interface, Intel Corporation, Intel Developer Forum, Feb. 25-28, 2002, slides 1-27.

PLX Technology, Inc., PLX to Showcase First PCT Express* Emulation at IDF, Press Release, Sep. 2, 2003.

PCI-SIG, Compaq, Dell, IBM, Intel and Microsoft Work Jointly with PCI-SIG to Create Open Specification for Next General-Purpose I/O, News Release, Aug. 3, 2001.

PCI-SIG, 22 Industry Leaders Join Arapahoe Work Group as Key Developers, Intel Developer Forum, News Release, Aug. 29, 2001.

Tommy Lee, PCI Express™ Design Enablement Efforts Accelerate Initial Product Testing in Early 2003. News Release, Nov. 19, 2002.

Intel, 22 Industry Leaders Join Arapahoe Work Group as Key Developers, Intel Developer Forum, Intel Press Release, Aug. 29, 2001.

Ray Weiss, 3GIO Named Successor to PCI/PCI-X, Oct. 29, 2001, Electronic Design, http://electronicdesign.com/article/embedded/3gio-named-successor-to-pci-pci-x3583.aspx.

Dodson, et al., Advanced Switching Makes PCI Express More Comms Friendly, EE/Times, News & Analysis, Dec. 12, 2002, http://www.eetimes.com/electronics-news/4143638/Advanced-Switching-Makes-PCI-Express-More-Comms-Friendly.

Stephen Shankland, Analysts Say Intel Proposal Could Split PC Industry, CNET News, Mar. 1, 2001, http://news.cnetcom/2100-1001-253420.html.

Stephen Shankland, Approval Near on Intel PC-Overhaul Plan, ZD Net, CNET News on Jul. 31, 2001, http://www.zdnetasia.com/approval-near-on-intel-pc-overhaul-plan-20098955.htm.

Dodson, et al., Advanced Switching Makes PCI Express More Comms Friendly, plx tECHNOLOGY, Dec. 12, 2002, http://www.eetimes.com/General/DisplayPrintViewContent?contentItemId=4143638.

eeProductCenter, CPCI Board Supports Multiprocessing, Feb. 2, 1999, http://www.eeproductcenter.com/showArticle.jhtml?articleID=15300408.

Akber Kazmi, Non-Transparent Bridging Makes PCI-Express HA Friendly, Aug. 14, 2003, http://www.eetimes.com/story/OEG20030814S0015.

PLX Technology, PLX Technology Announces First Controller Based on New Switch Fabric Architecture, Press Release, Mar. 26, 2001, http://www.plxtech.com/about/news/pr/2001/0326.

HiNT Corporation, HiNT Corporation announces its advanced 66 MHz/64 Bit Universal, Dual Mode (Transparent or Non Transparent), Hot Swap Capable (Mid-Transaction Extraction Problem Eliminated) PCI/PCI bridge for embedded and high-end platforms, Mar. 13, 2002.

Sarpa, et al., How HyperTransport and PCI Express Complement Each Other, EE/Times, News & Analysis, Dec. 23, 2002, http://www.eetimes.com/electronics-news/4143202/How-HyperTransport-and-PCI-Express-complement-each-other.

Jerry Ascierto, Intel Details Next-Generation I/O Spec, EE/Times, News & Analysis, Aug. 30, 2001, http://www.eetimes.com/electronics-news/4166991/Intel-details-next-generation-I-O-spec.

Stephen Shankland, Intel, AMD Square Off Over Standard, Jul. 25, 2001, CNET News, http://news.cnet.com/2100-1001-270578.html.

Budruk, et al., PCI Express System Architecture, Library of Congress Catalog Record, LCCN Control No. 2003015461, book, Published in Boston, 2004.
Budruk, et al., PCI Express System Architecture, MindShare, Inc., Published on Sep. 4, 2003, p. 42.
Budruk, et al., PCI Express System Architecture, MindShare, Inc., Published on Sep. 4, 2003, p. 48 and 50.
Budruk, et al., PCI Express System Architecture, MindShare, Inc., Published on Sep. 4, 2003, p. 54.
Budruk, et al., PCI Express System Architecture, MindShare, Inc., Published on Sep. 4, 2003, p. 132-133.
Budruk, et al., PCI Express System Architecture, MindShare, Inc., Published on Sep. 4, 2003, p. 48.
Budruk, et al., PCI Express System Architecture, MindShare, Inc., PC System Architecture Series, Published on Sep. 4, 2003, Cover Page.
Rick Merritt, PCI Group Takes Express to Comms OEMs, Jul. 23, 2003, EE/Times, News & Analysis, http://www.eetimes.com/electronics-news/4138926/PCI-group-takes-Express-to-comms-OEMs-item-1.
Jerry Steach, PLX Technology Announces PCI Express Collaboration with Catalyst Enterprises, Press Release, Jan. 15, 2004, http://www.plxtech.com/about/news/pr/2004/0115.
PLX Technology, Inc., PLX Technology Announces First Controller Based on New Switch Fabric Architecture, Press Release, Mar. 26, 2001, http://www.plxtechnology.com/about/news/pr/2001/0326.
PLX Technology, Inc., PLX, Technology Announces Industry's Most Complee GFlexible Line of PCI Express Switches, Bridges, Press Release, Apr. 19, 2004, http://www.plxtech.com/about/news/pr/2004/0419.
PLX Technology, Inc., PLX Announces Development of I/O Interconnect Devices Based on PCI Express Technology, Press Release, Aug. 19, 2002, http://www.plxtech.com/about/news/pr/2002/0819.
PLX Technology, Inc., PLX, MindShare to Deliver Second Comprehensive PCI Express Technical Seminar, Press Release, Jun. 9, 2004, http://www.plxtech.com/about/news/pr/2004/0609.
MindShare, Inc., MindShare, Inc. Announces Publication of PCI Express System Architecture, Press Release, Aug. 20, 2003, http://www.plxtech.com/about/news/pr/2003/0820.
PLX Technology, Inc., PLX Technology Online Seminar to Instruct System Design Community on How to Implement PCI Express Multiprocessor Applications, Press Release, Aug. 22, 2003, http://www.plxtech.com/about/news/pr12003/0822.
PLX Technology, Inc., PLX Joins Intel Developer Network for PCI Express Technology, Press Release, Sep. 9, 2002, http://www.plxtech.com/about/news/pr/2002/0909.
PLX Technology, Inc., PLX Provide In-Depth Webcast Oct. 21 on Implementing PCI Express in Multiprocessor Systems, Press Release, Oct. 14, 2003, http://www.plxtech.com/about/news/pr/2003/1014.
PLX Technology, Inc., PLX Reaches New Milestone in PCI Express, Press Release, Oct. 26, 2004, http://www.plxtech.com/about/news/pr/2004/1026.
PLX Technology, Inc., PLX Demonstrate Digital Imaging Over PCI Express Technology, Press Release, Feb. 17, 2004, http://www.plxtech.com/about/news/pr/2004/0217.
PLX Technology, Inc., PLX to Test PCI Express Technology at PCI-SIG Compliance Workshop, Press Release, Dec. 9, 2003, http://www.plxtech.com/about/news/pr/2003/1209.
PLX Technology, Inc., New PLX PCI Express, PCI, PCI-X Technologies Tested at PCI-SIG Compliance Workshop, Press Release, Mar. 17, 2004, http://www.plxtech.com/about/news/pr/2004/0317.
PLX Technology, Inc., PLX Technology Announces Industry's Smallest PCI Express Bridge Chip, Press Release, Jun. 8, 2004, http://www.plxtech.com/about/news/pr/2004/0608.
PLX Technology, Inc., PLX Showcases I/O Interconnect Expertise in Live Demonstrations, Technical-Session Tutorial, Press Release, Sep. 7, 2004, http://www.plxtech.com/about/news/pr/2004/0907.
PLX Technology, Inc., PLX Technology Announces Broad PCI Express Interconnect Family Based on Unique Architecture, Press Release, Jan. 14, 2003, http://www.plxtech.com/about/news/pr/2003/0114.

PLX Technology, Inc., PLX Technology Announces PCI Express Collaboration with Catalysis Enterprises, Press Release Jan. 15, 2004, http://www.plxtech.com/about/news/pr/2004/0115.
PLX Technology, Inc., PLX Technology to Deliver In-Depth PCI Express Seminar in TechOnline Webcast, Press Release, Feb. 19, 2003, http://www.plxtech.com/about/news/pr/2003/0219.
PLX Technology, Inc., PLX Technology to Deliver Third In-Depth PCI Express Seminar in TechOnline Webcast, Press Release, Mar. 18, 2003, http://www.plxtech.com/about/news/pr/2003/0318.
Nicolas Mokhoff, PLX to Specify 3GIO Silicon, Jan. 22, 2002, EE/Times, News & Analysis, http://www.eetimes.com/electronics-news/4141424/PLX-to-specify-3GIO-silicon.
Ray Weiss, Serialized PCI: The Next Bus Link, Jun. 21, 2000, EE/Times, News & Analysis, http://www.eetimes.com/electronics-news/4197032/Serialized-PCI-The-Next-Bus-Link.
Loring Wirbel, StarFabric Association Joins Forces with PCI Group, Aug. 12, 2002, EE/Times, News & Analysis, http://www.eetimes.com/electronics-news/4142846/StarFabric-association-joins-forces-with-PCI-group.
Business Wire, StarGen Unveils Plans for Future Communications Products; Will Demonstrate PIC 2.17 StarFabric Development Platform to Show the Capabilities of StarFabric in Communication Applications, Press Release, Article Date, Sep. 23, 2002, http://www.highbeam.com/doc/1G1-91910757.html.
Jack Regula, Using Non-Transparent Bridging in PCI Express Systems, PLX Technology Inc., Jun. 1, 2004, pp. 1-31.
John Gudmundson, Enabling Multi-Host System Designs with PCI Express Technology, May 2004, PLX Technology, TechFeature, PCI Express, Article.
Regula, et al., Using Non-Transparent Bridging in PCI Express Systems, Sep. 10, 2003, PLX Technology, Inc., pp. 1-31.
Intel, 21554 PCI-to-PCI Bridge for Embedded Applications, Dec. 1998, Product Preview Datasheet, pp. 1-52.
Intel, 21554 Embedded PCI-to-PCI Bridge Hardware Implementation, Mar. 1999, Application Note, pp. 1-24.
Intel, 21554 Embedded PCI-to-PCI Bridge Performance Optimization, Sep. 1998, Application Note, pp. 1-13.
Intel, 21554 PCI-to-PCI Bridge, Sep. 2000, Specification Update, pp. 1-16.
Intel, 21555 Non-Transparent PCI-to-PCI Bridge, Sep. 2000, Specification Update, pp. 1-14.
Bob Davis, PEI-8 PCI Express AS Core, Network Appliance, Inc., Oct. 27, 2002.
John Beaton, EID 2002-2003 Demo Plan for PCI Express, May 2002, slides 1-33.
Gary Solomon, PCI Express—AS (Advanced Switching) Architecture Overview, AWG ExAS KD Event, Nov. 20, 2002, slides 1-28.
HiNT, HiNT HB6 Dual Mode Universal PCI-to-PCI Bridge, Datasheet, Rev. 1.0, Jan. 18, 2002, pp. 1-187.
Ramin Neshati, PCI Express * (formerly 3GIO) Specification Ready for Use in Early Designs, Intel Developer Update Magazine, Jul. 2002, pp. 1-4.
Jack Regula, Using Non-Transparent Bridging in PCI Express Systems, PLX Technology, Inc., Jun. 1, 2004, pp. 1-31.
PCI Express, PCT Express™ Base Specification Revision 1.0, Jul. 22, 2002, pp. 1-422.
PCI Express, PCT Express™ Base Specification Revision 1.0a, Apr. 15, 2003, pp. 1-428.
Arapahoe, 3GIO Base Specification, Rev. 1.0, Release Candidate, Feb. 22, 2002, pp. 1-310.
John Gudmundson, Enabling Multi-Host System Designs with PCI Express Technology, May 2004, PLX Technology, Tech Feature, PCI Express, pp. 1-5.
Danny Chi, Designing for Performance with PCI Express™, Feb. 25, 2003, PLX Technology, TechOnLine Webcast, http://seminar2.techonline.com/~plx22/feb2503/archive/blank.html.
Jack Regula, Utilizing Non-Transparent Bridging in PCI Express Base to Create Multi-Processor Systems, Part II, Oct. 21, 2003, PLX Technology, TechOnLine Webcast, http://seminar2.techonline.com/~plx22/oct2103/archive/userStart.html?audio=0.
Danny Chi, Designing for Performance with PCI Express™, Feb. 25, 2003, PLX Technology, TechOnLine Webcast, http://seminar2.techonline.com/~plx22/feb2503/archive/blank.html.

Intel, The Impact of Advanced Switching (AS), 2002, TechOnLine Webcast, http://seminar2.techonline.com/~intel22/oct2902/archive/userStart.html.

* cited by examiner

ROUTING DATA UNITS BETWEEN DIFFERENT ADDRESS DOMAINS

RELATED APPLICATION INFORMATION

This patent is a continuation of U.S. application Ser. No. 12/195,122, filed Aug. 20, 2008, now U.S. Pat. No. 7,814,259, which is a continuation of U.S. application Ser. No. 11/031,853 filed Jan. 6, 2005, now U.S. Pat. No. 7,421,532, which is a continuation-in-part of U.S. application Ser. No. 10/993,277 filed Nov. 18, 2004, now U.S. Pat. No. 7,454,552, which claims priority from U.S. application Ser. No. 60/523,246 filed Nov. 18, 2003.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to data switches.

2. Description of the Related Art

The Peripheral Component Interconnect ("PCI") standard was promulgated about ten years ago, and has since been updated a number of times. One update led to the PCI/X standard, and another, more recently, to PCI Express. The PCI standards are defined for chip-level interconnects, adapter cards and device drivers. The PCI standards are considered cost-effective, backwards compatible, scalable and forward-thinking.

PCI buses, whether they be PCI Express or previous PCI generations, provide an electrical, physical and logical interconnection for multiple peripheral components of microprocessor based systems. PCI Express systems differ substantially from their PCI and PCI/X predecessors in that all communication in the system is performed point-to-point. Unlike PCI/X systems in which two or more end points share the same electrical interface, PCI Express buses connect a maximum of two end points, one on each end of the bus. If a PCI Express bus must communicate with more than one end point, a switch, also known as a fan out device, is required to convert the single PCI Express source to multiple sources.

The communication protocol in a PCI Express system is identical to legacy PCI/X systems from the host software perspective. In all PCI systems, each end point is assigned one or more memory and IO address ranges. Each end point is also assigned a bus/device/function number to uniquely identify it from other end points in the system. With these parameters set a system host can communicate with all end points in the system. In fact, all end points can communicate with all other end points within a system.

DETAILED DESCRIPTION OF THE INVENTION

Throughout this description, the embodiments and examples shown should be considered as exemplars, rather than limitations on the apparatus and methods of the present invention.

Description of Systems

Figure 1:
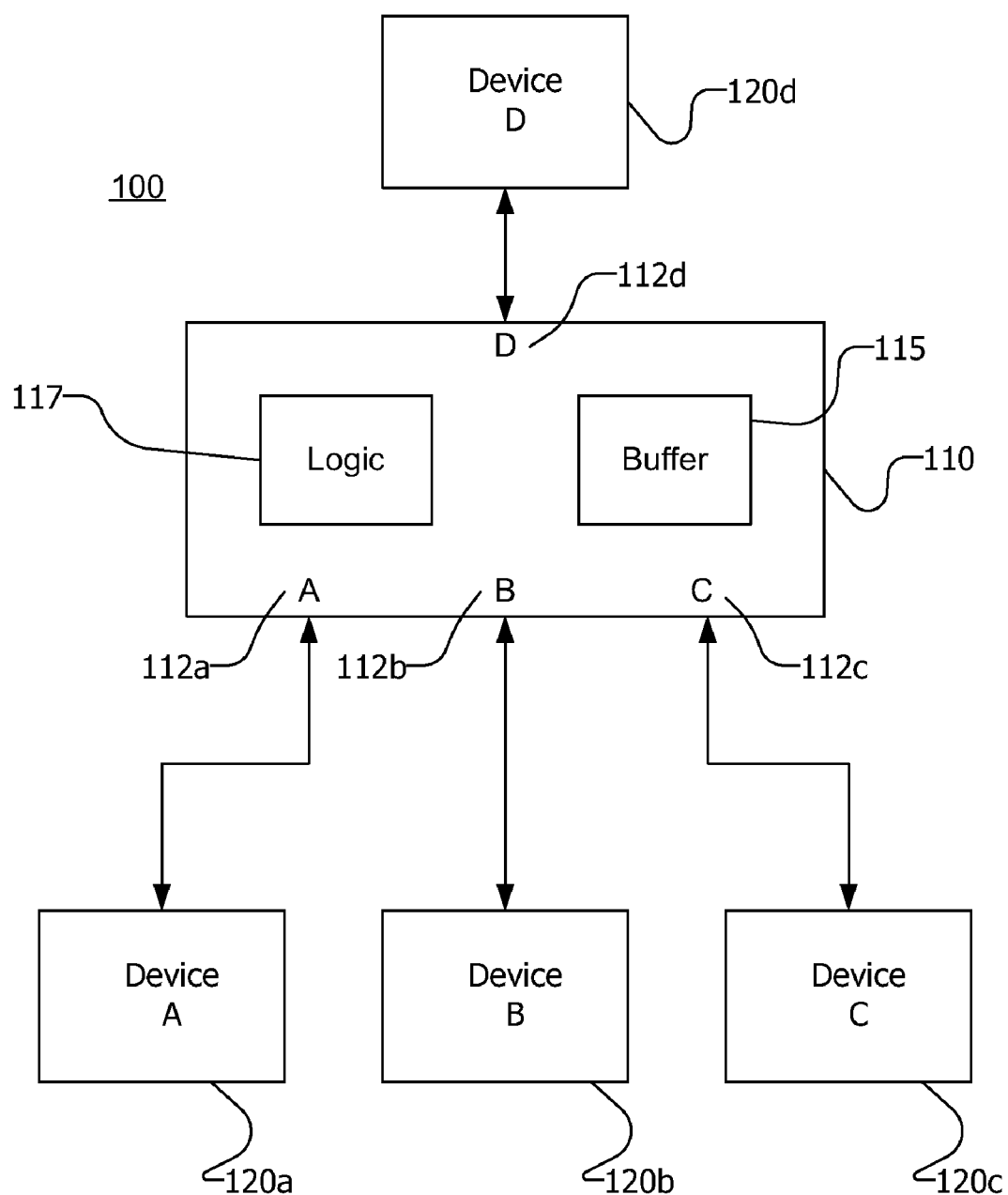
FIG. 1 is a block diagram of a switching environment.

Referring now to FIG. 1, there is shown a block diagram of a switching environment 100. The switching environment includes a switch 110 and a number of end points 120a, 120b, 120c, 120d. The switching environment 100 may be a point-to-point communications network.

The term "switch" as used herein means a system element that logically connects two or more ports to allow data units to be routed from one port to another, and the switch 110 is a switch. The switch routes data units using memory-mapped I/O or I/O-mapped I/O (both, collectively, "mapped I/O"). The switch 110 further includes a buffer 115 and logic 117. The switch 110 includes a number of ports 112a, 112b, 112c, 112d, which are physical interfaces between the buffer 115 and logic 117 and the end points 120.

By data unit, it is meant a frame, cell, datagram, packet or other unit of information. In some embodiments, such as PCI, a data unit is unencapsulated. Data units may be stored in the buffer 115. By buffer, it is meant a dedicated or shared memory, a group or pipeline of registers, and/or other storage device or group of storage devices which can store data temporarily. The buffer 115 may operate at a speed commensurate with the communication speed of the switching environment 100. For example, it may be desirable to provide a dedicated memory for individual portions (as described below) and pipelined registers for multicast portions (as described below).

The logic 117 includes software and/or hardware for providing functionality and features described herein. The logic 117 may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the logic 117 may include various specialized units, circuits, software and interfaces for providing the functionality and features described herein. The invention may be embodied in whole or in part in software which operates in the switch 110 and may be in the form of firmware, an application program, an applet (e.g., a Java applet), a browser plug-in, a COM object, a dynamic linked library (DLL), a script, one or more subroutines, or an operating system component or service. The hardware and software of the invention and its functions may be distributed such that some components are performed by the switch 110 and others by other devices.

The end points 120a, 120b, 120c, 120d are logical devices which connect to and communicate with the switch 110 respectively through the ports 112. At least some of the end points may share an address domain, such as a memory address domain or an I/O address domain. The term "address domain" means the total range of addressable locations. If the shared address domain is a memory address domain, then data units are transmitted via memory mapped I/O to a destination address into the shared memory address domain.

The end points 120 may be connected to the ports 112 by electrical contacts, wirelessly, optically or otherwise.

Figure 2:
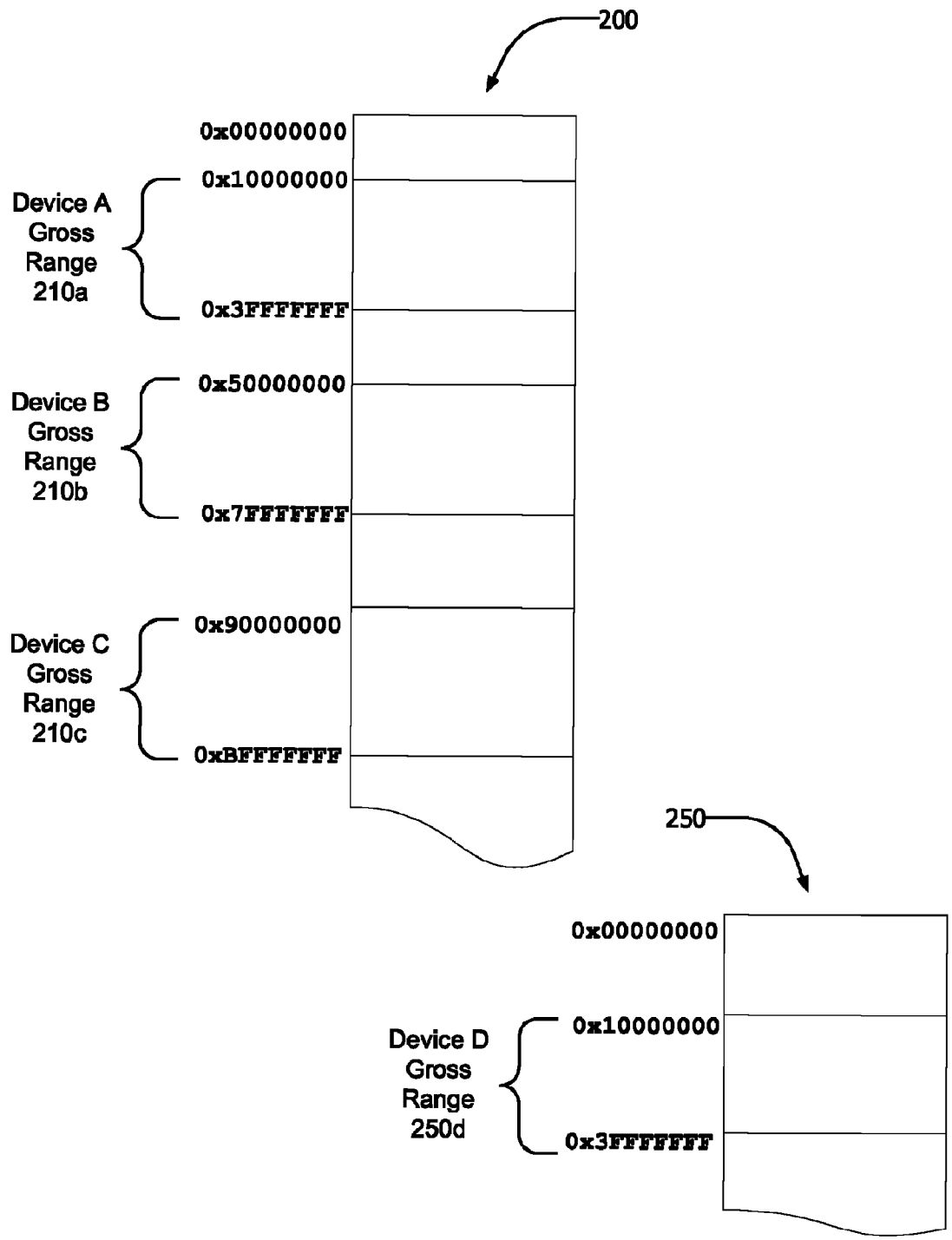
FIG. 2 is a diagram of address domains.

Referring now to FIG. 2, there is shown a diagram of two address domains 200, 250. One address domain 200 is shared by end points 120a, 120b, 120d, and the other address domain 250 is not shared and used only by end point 120d. This is just an example; there may be more than two address domains, and more than one address domain may be shared.

The address domains 200, 250 are contiguous ranges. Each address domains is defined by a master end point. Address portions associated with the individual end points 120 may be non-contiguous and the term "portions" is meant to refer to contiguous and non-contiguous spaces. The master end point for a given address domain allocates address portions to the other end points which share that address domain. The end points communicate their address space needs to the master device, and the master device allocates address space accordingly.

Data units may be written into or communicated into an address portion. In a switch conforming to the PCI Express standard, it is expected that the address portions in a 32-bit shared memory address domain or shared I/O address domain will be at least as large as the largest expected transaction, and comparable to those shown in FIG. 2.

Within the shared address domain 200, separate address portions 210a, 210b, 210c may be associated with the corresponding end points 120a, 120b, 120c. The address domain 200 may be allocated so as to provide the corresponding end points 120a, 120b, 120c with unique address portions. The address portions may be unique within the shared address domain 200 with respect to one another.

Within the non-shared address domain 250, there may be a portion 250d associated with the end point 120d. The non-shared address domain 250 is considered isolated from the shared address domain 210. Other non-shared address domains could be included, and they would also be considered isolated from the shared address domain, and from each other. By "isolated" it is meant that the address domains are separated such that interaction does not directly take place between them, and therefore uniquely addressable addresses are provided.

The address portions 210 may have various characteristics. The address portions 210 may have respective sizes. The sizes may be fixed or variable. The address portions 210 may be defined by a base address, as well as by a size or end address. The address portions 210 may come to be associated with the end points 120 through an arbitrage process, through centralized assignment (e.g., by a host or the switch 110), otherwise or through a combination of these. The address portion 210 for a given end point 120 need not be contiguous. To avoid errors, it may be desirable if the address portions 210 within the same address domain do not overlap.

Data units may be directed to one or more of the end points 120 by addressing. That is, a destination address is associated with and may be included in the data units. The destination address determines which end point 120 should receive a given data unit. Thus, data units addressed to the individual portion for a given end point 120 should be received only by that end point 120. Depending on the embodiment, the destination address may be the same as the base address or may be within the address portion.

The end points 120 may be associated with respective ports 112. Through this association, a given end point 120 may send data units to and receive data units from its associated port 112. This association may be on a one-to-one basis. Because of these relationships, the ports 112 also have associations with the address portions 210 of the end points 120. Thus, the ports 112 may be said to have address portions 210 within the address domains 200, 250.

Ports within a shared addressed domain are considered "transparent", and those not within a shared address domain are considered "non-transparent". Data units from one transparent port to another may be transferred directly. However, data units between a transparent port and a non-transparent port require address translation to accommodate the differences in their respective address domains. Transparent ports are logical interfaces within a single addressing domain. Non-transparent ports allow interaction between completely separate addressing domains, but addresses from one domain must be converted from one domain to the other.

The status of a port—transparent or non-transparent—may be fixed or configurable. The logic 117 may allow designation on a port-by-port of transparency or non-transparency, including the address domain for a given port. The switch 110 may be responsive to requests or instructions from the devices 120 to indicate such things as which address domain the devices will be in, and the address portion associated with a given device.

Description of Methods

Figure 3:
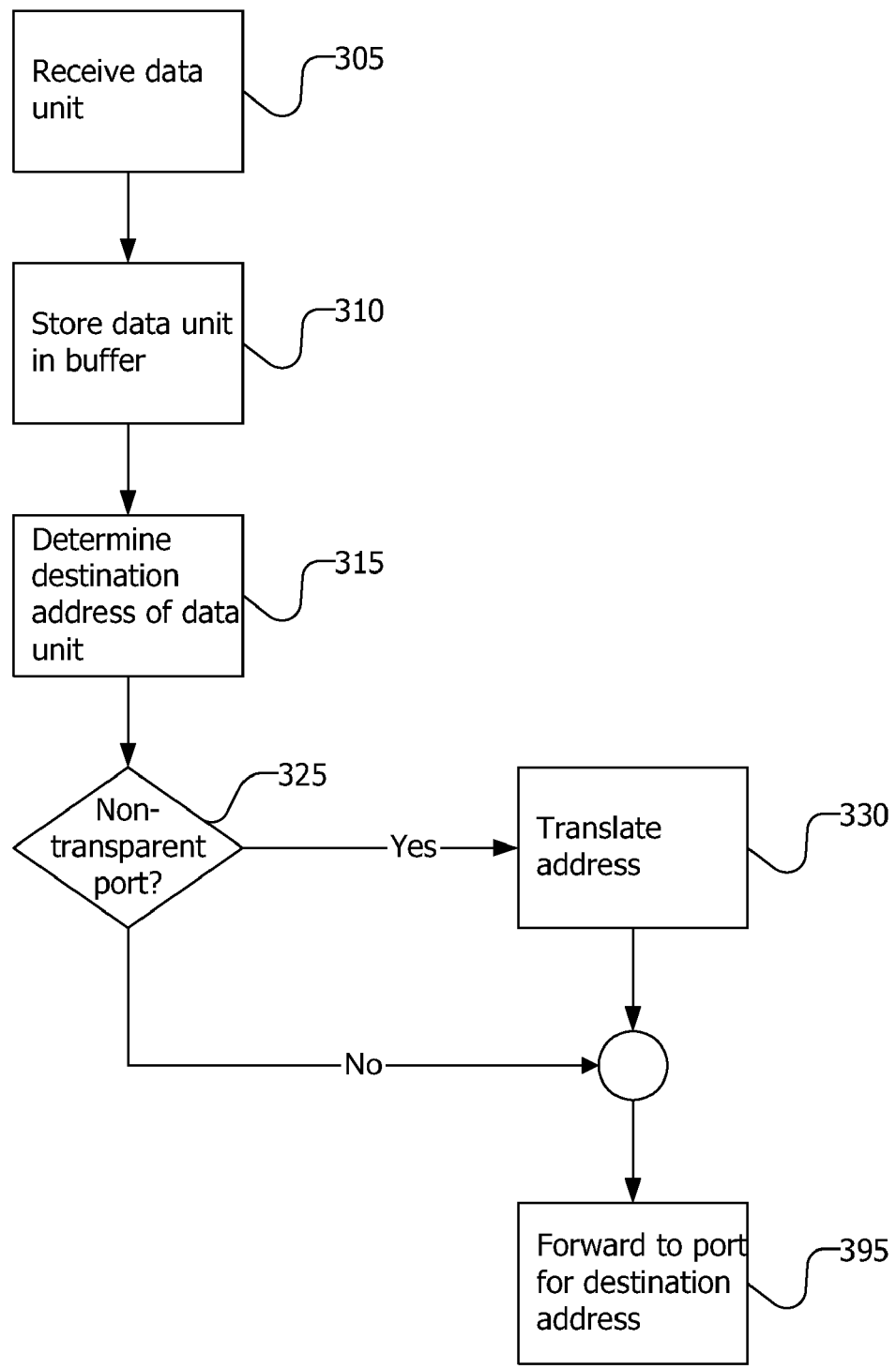
FIG. 3 is a flow chart of a process for switching data units.

Referring now to FIG. 3 there is shown a flow chart of a process for switching data units. The process employs a switch having transparent and non-transparent ports, such as the switches described above. In the switch, the transparent ports are associated with a shared address domain, and the non-transparent ports are associated with non-shared address domains.

Domain maps for each address domain may be communicated to the switch. There may be provided a master end point, such as a processor, which is responsible for allocating address portions within its address domain. End points may communicate their address space needs to the master device, and the master device may allocate address space accordingly. The master device may query end points for their address space needs. These allocations, and other allocations and designations, define the address map which the master end point communicates to the switch. The switch may receive a single communication of an address map from a master end point. The switch may receive partial or revised address maps from time to time.

In a first step 305, the switch receives a data unit. The switch then stores the data unit in a buffer (step 310). Next, the switch determines the destination address of the data unit (step 315). Next, the switch determines whether the destination address is associated with a transparent or non-transparent port (step 325).

If the address is associated with a non-transparent port, then the switch translates the address (step 330). Many different schemes of memory and I/O address translation for mapping from one address domain into another may be used. These schemes include direct memory translation both with and without offsets, and indirect memory translation through lookup registers or tables. Furthermore, addresses may be translated using schemes other than address map translation, such as mailbox mechanisms and doorbell registers.

Whether or not translated, the switch forwards the data unit to the port for the designated destination address (step 395). In this way, data units are transferred between the transparent ports, between the transparent and non-transparent ports, and between the non-transparent ports. In effect, non-transparent ports allow data transfers from one address domain to another.

In one embodiment, the switch is a PCI Express switch in which one or more of the interfaces (i.e., ports) are optionally non-transparent. A device connected to a non-transparent port of the switch is isolated from the address domain of the other ports on the switch. Two or more processors with their own address maps could all communicate with each other through this type of PCI Express switch.

With regard to FIG. 3, additional and fewer steps may be taken, and the steps as shown may be combined or further refined to achieve the methods described herein.

Non-transparent operation allows a local subsystem to maintain a full address range completely separate from the main system. In addition, the presence of the local bus is obfuscated from the main system by presenting the non-transparent bridge as an endpoint. Bus enumeration and discovery software remains unaware of the presence of the secondary local bus, allowing for a higher level of abstraction at the system level.

To provide both transparent and non-transparent ports, a transparent bridge may be associated with a different type of configuration space than a non-transparent bridge. Upon discovering the transparent type configuration space, bus enumeration and discovery software may read "through" the bridge device in an attempt to identify additional downstream devices. A non-transparent bridge, on the other hand, masks the presence of the secondary local bus by identifying itself as an endpoint. The endpoint association is made via a non-transparent type configuration header. Upon discovering a non-transparent type configuration space, bus enumeration and discovery software is satisfied and does not attempt to read through the non-transparent bridge.

A PCI Express switch (including a bridge as described herein) in non-transparent mode allows completely independent and unrestricted address ranges to exist on both sides of the bridge. Transactions passing through the bridge will have their addresses remapped to a correlating destination address. A local host processor may be responsible for maintaining address translation and configuration registers. When address configuration is complete, a primary side lockout bit may "wake" the primary PCI Express endpoint interface, allowing it to respond to bus discovery queries.

Addresses may be remapped in a three-stage process. First, the size and configuration of each address base address range is set by the local host. This allows software agents on the main host to allocate and distribute the main memory map. Next, the local host programs the translation offset. Finally, software agents on each side of the bridge perform standard PCI address mapping techniques to map the respective address regions into system memory space.

Upon receiving a transaction that falls within a given base address range, a translation function overwrites the upper bits of the address with the translated base offset, or some other address translation technique. Thus, separate address ranges are maintained on both sides of the non-transparent bridge. A downstream range may be associated with requests moving from the PCI Express to the PCI interface. An upstream range is associated with request moving from the local PCI bus to the PCI Express interface.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method for routing data units, comprising:
   coupling a plurality of devices to a corresponding plurality of physical interfaces, each physical interface having a respective configurable status and a respective address domain, wherein in a first status the physical interface is transparent, and in a second status the physical interface is non-transparent;
   setting the status of each of the plurality of physical interfaces as transparent or non-transparent; and
   switching data units between the physical interfaces using mapped address input/output, switching data units including masking the respective address domains for interfaces configured as non-transparent.

2. A method for switching data units within a system including a host processor and a plurality of devices, the method comprising:
   coupling the host processor and the plurality of devices to respective physical interfaces of a switch, each physical interface having a configurable status, wherein in a first status the physical interface is transparent, and in a second status the physical interface is non-transparent;
   setting the status of the physical interface coupled to the host processor as transparent;
   for each of the plurality of devices:
      setting the status of the corresponding physical interface as transparent if the device shares an address domain with the host processor, or
      setting the status of the corresponding physical interface as non-transparent if the device has an address domain separate from the address domain of the host processor; and
   switching data units between the physical interfaces using mapped address input/output, including masking the respective address domains for devices coupled to physical interfaces configured as non-transparent.

3. A method for switching data units, comprising:
   coupling a first transparent physical interface to a first device having a first address in a first shared address domain;
   coupling a second transparent physical interface to a second device having a second address in the first shared address domain;
   coupling a third physical interface to a third device, the third physical interface configurable to be transparent or non-transparent;
   configuring the third physical interface as transparent when the third device has a third address in the first shared address domain;
   configuring the third physical interface as nontransparent when the third device has an address in a second address domain isolated from the first address domain; and
   routing data units between the first transparent physical interface, the second transparent physical interface and the third physical interface in accordance with a PCI Express interconnect standard.

4. A PCI Express switch comprising:
   a plurality of physical interfaces for interfacing to a corresponding plurality of devices; and
   logic for routing data units between the plurality of physical interfaces in accordance with a PCI Express interconnect standard,
   wherein
      each physical interface may be configured as transparent or nontransparent,
      all physical interfaces configured as transparent are for interfacing with devices having addresses within a first shared address domain,
      each physical interface configured as nontransparent is for interfacing with a device having addresses in an address domain isolated from the first address domain.

5. A PCI Express switch comprising:
   a plurality of physical interfaces for interfacing to a corresponding plurality of devices; and logic for routing data units between the plurality of physical interfaces in accordance with a PCI Express interconnect standard,
wherein:
one physical interface, selected from the plurality of physical interfaces, can be configured to be nontransparent
the physical interfaces, other than the selected nontransparent physical interface, are for interfacing with devices having addresses within a first shared address domain
the selected nontransparent physical interface is for interfacing with a device having an address in a second address domain isolated from the first address domain.

* * * * *